United States Patent [19]

Grunert et al.

[11] Patent Number: 5,738,138
[45] Date of Patent: Apr. 14, 1998

[54] REDUCED WATER HAMMER CONTROL VALVE

[75] Inventors: Jordan Bryce Grunert, Beaver; James R. Shannon, Pittsburgh, both of Pa.

[73] Assignee: The Horton Company, Pittsburgh, Pa.

[21] Appl. No.: 814,782

[22] Filed: Mar. 10, 1997

[51] Int. Cl.⁶ .................... F16K 31/385; F16K 31/40
[52] U.S. Cl. .................... 137/245; 251/30.04; 251/38; 251/45
[58] Field of Search .................... 137/244, 245; 15/104.03, 104.05; 222/148, 149; 251/30.01, 30.02, 30.03, 30.04, 30.05, 38, 45, 46

[56] References Cited

U.S. PATENT DOCUMENTS

| | | |
|---|---|---|
| 207,482 | 8/1878 | Blessing .................... 137/245 |
| 1,146,009 | 7/1915 | Mason .................... 137/245 |
| 1,165,913 | 12/1915 | Shanks .................... 137/245 |
| 2,500,750 | 3/1950 | Halenza .................... 251/38 |
| 3,391,900 | 7/1968 | Erickson .................... 251/30.03 |
| 3,400,731 | 9/1968 | McCornack .................... 137/245 |
| 3,763,881 | 10/1973 | Jones .................... 137/414 |
| 4,787,411 | 11/1988 | Moldenhauer .................... 137/244 |
| 4,915,347 | 4/1990 | Iqbal et al. .................... 251/30.03 |
| 5,027,850 | 7/1991 | Peterson et al. .................... 137/242 |
| 5,180,138 | 1/1993 | Moldenhauer .................... 251/30.05 |
| 5,456,279 | 10/1995 | Parsons et al. .................... 137/245 |

FOREIGN PATENT DOCUMENTS

| | | |
|---|---|---|
| 0090176 | 7/1981 | Japan .................... 251/38 |
| 412491 | 8/1964 | Switzerland .................... 137/244 |

*Primary Examiner*—George L. Walton
*Attorney, Agent, or Firm*—Sixbey, Friedman, Leedom & Ferguson, P.C.; Donald R. Studebaker

[57] ABSTRACT

A control valve assembly for selectively controlling a flow of fluid through a fluid flow system is disclosed including a valve housing having a fluid inlet and a fluid outlet, a valve seat positioned about the fluid outlet and a sealing diaphragm for cooperating with the valve seat for selectively sealing off fluid communication between the fluid inlet and the fluid outlet. The diaphragm fluidically separates a pressure chamber from a control chamber within the housing. A central control orifice is formed in the diaphragm for fluidically communicating between the control chamber and the fluid outlet, an armature is reciprocally received in the housing for selectively sealing off fluid communication between the control chamber and the fluid outlet with at least two bleed orifices formed on the diaphragm which fluidically communicate between the pressure chamber and the control chamber. Extending into each of the bleed orifices is a metering element for controlling a flow of fluid between the pressure chamber and the control chamber for softening the return of the diaphragm to the closed position thereby eliminating compressive shock to the assembly. Preferably, the bleed orifices are diametrically opposed to one another and formed in a thinned region of the diaphragm which bridges a fixed outer periphery and a central region of the diaphragm.

16 Claims, 3 Drawing Sheets

REDUCED WATER HAMMER CONTROL VALVE

TECHNICAL FIELD

The present invention relates to the control of fluid flow in fluid dispensing systems and more particularly to a valve having a significantly reduced water hammer effect.

BACKGROUND OF THE INVENTION

In providing flow control to various types of dispensing systems, which are connected to either domestic or international water supplies, it is desired to provide a generally constant flow rate to the dispenser inlet despite being provided with wide variations in the water supply pressure. Further, it is desired to provide a stable control valve which reduces the effect of the initiating and stopping of the flow on the surrounding components of the system. Particularly, it is desired to reduce the water hammer effect produced during the closure of the control valve. That is, upon typical closure of a water valve, particularly electromagnetically operated valves, the flow rate is brought to an abrupt stop by a diaphragm or other clapper closing path of flow. Often times, these valves are utilized in systems where a pressure head is available to drive the fluid through a piping system to an ultimate outlet. The valve is most likely located near the exit of the system so as to minimize the after stop drip quantity that would spill or leak from the outlet.

One such valve of this type is disclosed in U.S. Pat. No. 3,763,881 issued to Jones which utilizes the force of the supply water pressure to aid in the opening of the control valve. In this case, a float control valve for a reservoir is set forth and includes a pilot valve which is actuated directly by a float in the reservoir of the system. In this case, in an effort to prevent concussive shock in the system, a metering pin extends through a bleed hole in the base portion of the diaphragm in order to cushion the closure of the diaphragm. Additionally, the restrictor pin ensures that any particles in the water are unable to block the bleed hole. In operation, when the reservoir is low, pressure on the closure side of the diaphragm is reduced, thus enabling the applied pressure of the fluid to open the valve. Once the reservoir is full, the pressure of the fluid acting on the closure side of the diaphragm is greater than that on the opening side and thus the flow of fluid through the system is stopped. However, the metering pin is formed in conjunction with the housing of the system and if this pin fails, the entire housing must be replaced. Moreover, the bleed orifice extends through a thickened portion of the diaphragm which experiences minimal flexure and thus particulate matter may build up on the side walls of the elongated bleed hole.

Similarly, U.S. Pat. No. 4,915,347 issued to Iqbal et al. discloses an electronically actuated solenoid control valve including a valve plate connected to a diaphragm with the thickened portion of the diaphragm and valve plate including a metering hole for receiving a pin which prevents particles in the water from blocking the metering holes. Again, the pin is incorporated into the structure of the housing and thus any replacement thereof requires significant expense. Moreover, in that the bleed hole is formed in both the diaphragm and valve plate, the bleed hole is of an elongated length which despite the action of the pin may become clogged due to adhesion of the particles to the side wall of the bleed hole.

In an effort to overcome some of the above-noted problems, U.S. Pat. Nos. 4,787,411 and 5,180,138 issued to Moldenhauer disclose electronically actuated control valves including springs made from round spring wire which extend into a bleed orifice formed in the valve plate of the valve. In U.S. Pat. No. 4,787,411, the valve plate includes a central axial relief bore which connects a control space to an outflow chamber. Also formed in the valve plate is a control bore which receives a pin made of round spring wire. When energized, the relief bore is opened, thus creating the pressure differential across the diaphragm which displaces the valve plate in a known manner thus communicating the inlet and outlet passages of the system. While the control bore includes the elongated wire which is an improvement over the fixed pins of the prior art, this wire again extends through the valve plate which does not experience the flexure of the flex portion of the diaphragm and consequently, it may be possible for contaminants to build up on the side wall of the bore as discussed hereinabove. Likewise, U.S. Pat. No. 5,180,138 includes a spring wire which extends through a relief bore formed in the valve plate which is of minimal flexure. Additionally, each of the above-noted valves include only a single control bore which, if clogged, destroys the operation of the valve. Further, with only one control bore, the operation may be somewhat unstable.

Clearly, there is a need for an electronically actuated control valve including diametrically opposed control bores or bleed holes which aid in the stable closing of the diaphragm upon de-energization of the electronic control valve. Further, there is a need for an economical means of metering the water flow through the bleed holes while assuring that the bleed holes remain free of contamination.

SUMMARY OF THE INVENTION

A primary object of the present invention is to overcome the aforementioned shortcomings associated with prior art devices.

A further object of the present invention is to provide a control valve which provides for the stable and controlled closing of the valve.

Yet another object of the present invention is to provide a control valve assembly which may be readily serviced in an economical manner.

Yet another object of the present invention is to provide a control valve having diametrically opposed bleed orifices which aids in the stable operation of the valve.

An additional object of the present invention is to provide a wire form which extends into each of the diametrically opposed bleed orifices to provide a stable and controlled closure of the valve.

Yet another object of the present invention is to provide a wire form having a diameter associated with the diameter of the bleed orifices in order to permit closure of the diaphragm to be carried out in a controlled manner.

These as well as additional objects of the present invention are achieved by providing a control valve assembly for selectively controlling a flow of fluid through a fluid flow system including a valve housing having a fluid inlet and a fluid outlet, a valve seat positioned about the fluid outlet and a sealing diaphragm for cooperating with the valve seat for selectively sealing off fluid communication between the fluid inlet and the fluid outlet. The diaphragm fluidically separates a pressure chamber from a control chamber within the housing. A central control orifice is formed in the diaphragm for fluidically communicating between the control chamber and the fluid outlet, an armature is reciprocally received in the housing for selectively sealing off fluid communication between the control chamber and the fluid outlet with at least two bleed orifices formed on the diaphragm which fluidically communicate between the pressure chamber and the control chamber. Extending into each of the bleed orifices is a metering element for controlling a flow of fluid between the pressure chamber and the control chamber for softening the return of the diaphragm to the closed position thereby eliminating compressive shock to the assembly. Preferably, the bleed orifices are diametrically opposed to one another and formed in a thinned region of the diaphragm which bridges a fixed outer periphery and a central region of the diaphragm.

These as well as additional advantages of the present invention will become apparent from the following detailed description of the present invention when read in light of the several figures.

DETAILED DESCRIPTION OF THE PRESENT INVENTION

Figure 1:
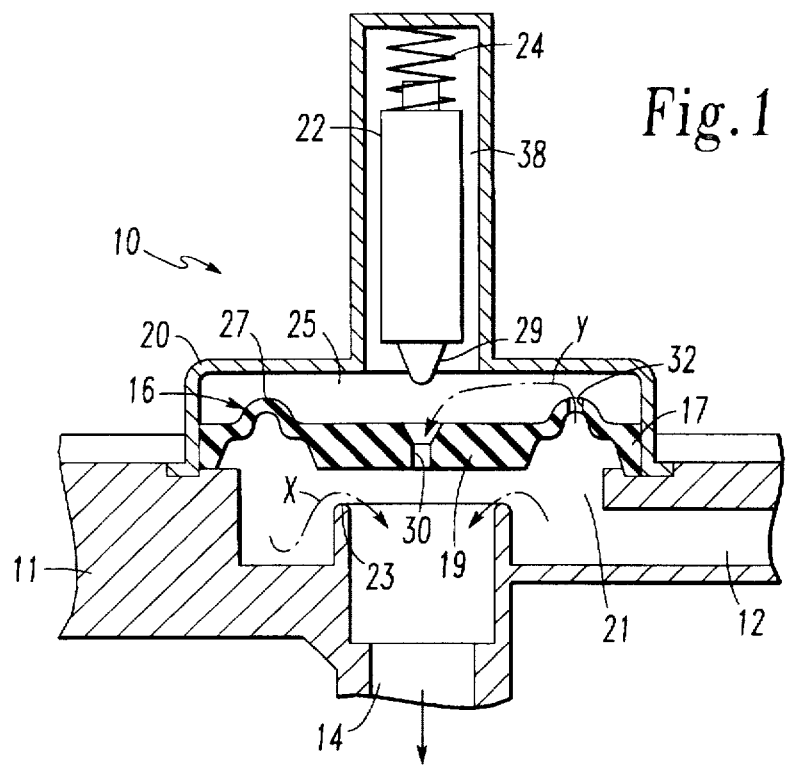
FIG. 1 is a cross-sectional view of a control valve to which the present invention is readily adapted.

Referring now to the several figures wherein like reference numerals will be used to designate like components, FIG. 1 is a cross-sectional schematic view of a valve 10 to which the present invention may be readily adapted. The valve includes a valve housing 11 having an inlet 12 and outlet 14 extending therefrom. Positioned within the housing 11 is a diaphragm 16 which seals off fluid communication between the inlet 12 and outlet 14 and which may be readily displaced in response to movement of an armature 22 provided within the armature guide 20. The outer periphery 17 of the diaphragm 16 is secured in place while the interior portion 19 of the diaphragm is permitted to reciprocate within the housing 11 in response to movement of the armature 22 and fluid pressure exerted on the diaphragm through inlet 12.

Valve inlet 12 opens into an annular pressure chamber 21 that communicates by way of valve seat 23 with the outlet 14. Above the diaphragm 16 is a control space 25 that is formed by the upper surface of the diaphragm 16 and the armature guide 20. The diaphragm 16 includes a thinned region 27 which permit the central portion 19 of the diaphragm 16 to readily reciprocate within the housing 11. These thinned areas provide the flexure joint between the outer periphery 17 and central portion 19 of the diaphragm 16.

The armature 22 is readily displaced within the armature guide 20 by way of an electromagnetic actuator (not shown). Biasing the armature 22 in the closed direction is coil spring 24. The armature 22 includes an extended nose 29 which seals off the central orifice 30 formed in the central portion 19 of the diaphragm 16. The significant of which will be discussed in greater detail hereinbelow. Also provided in the thinned region 27 of the diaphragm 16 is a bleed orifice 32, the significance of which will be discussed in connection with the operation of the valve illustrated in FIG. 1.

The particular function of the valve illustrated in FIG. 1 will now be described in greater detail.

As with most control valves, the fluid passing through the inlet is directed to the control valve under pressure. The pressurized fluid passing through the inlet 12 pressurizes the pressure chamber 21, however, with the valve in the closed position, the central portion 19 of the diaphragm 16 seals against the valve seat 23 preventing fluid communication between the pressure chamber 21 and fluid outlet 14. By way of the bleed orifice 32, the control space 25 is pressurized to the same pressure as that of the fluid in the pressure chamber 21. Likewise, the space about the armature 38 is also at the same pressure as that of the control chamber 25 and pressure chamber 21 thereby reducing armature vibration. When activated, the armature 22 is displaced upwardly opening the central bore 30 and permitting the fluid within the control chamber 25 to pass into the outlet 14 thus relieving the pressure with the control chamber 25. In doing so, the pressure within the control chamber 25 is reduced with respect to the pressure within the pressure chamber 21, thus permitting displacement of the central portion 19 of the diaphragm 16 in the manner illustrated in FIG. 1 by way of fluid pressure in the pressure chamber 21. When in the opened condition, fluid passes in the direction of arrows X and Y for a predetermined time as directed by the particular application of the control valve.

When de-energized, the armature 22 is displaced towards the diaphragm 16 by way of the coil spring 24 to close off the central bore 30. Continued flow of fluid through the bleed orifice 32 allows the fluid pressure within the chamber 25 to become equal with that in pressure chamber 21, thus permitting the coil spring 24 to press the armature 22 against the central region of the diaphragm 19 to seal off the fluid communication between the inlet 12 and outlet 14 by seating the central portion 19 of the diaphragm 16 against the valve seat 23.

As can be readily appreciated from the above description, should the bleed orifice 32 formed in the diaphragm 16 become clogged or otherwise obstructed, the operation of the valve would be severely hampered. Particularly, because the flow rate would be brought to an abrupt stop by the diaphragm, the water within the pressure chamber 21 becomes slightly compressed with this compression being released in a reverse direction through the inlet 12 resulting in a phenomenon known as water hammer. This phenomenon, while presenting an audible bang, also stresses the mechanical components of the system which over time can result in failure of the valve or other components of the system.

In an effort to overcome this phenomenon, the system of U.S. Pat. No. 4,787,411 discussed hereinabove provides a wire which extends through a bleed orifice formed in a valve plate which is attached to the diaphragm. However, as noted hereinabove, this construction may lead to costly service of the valve and also may not result in the complete de-clogging of the bleed orifice.

Referring now to FIGS. 2–5, the present invention will be discussed in detail.

Figure 2:
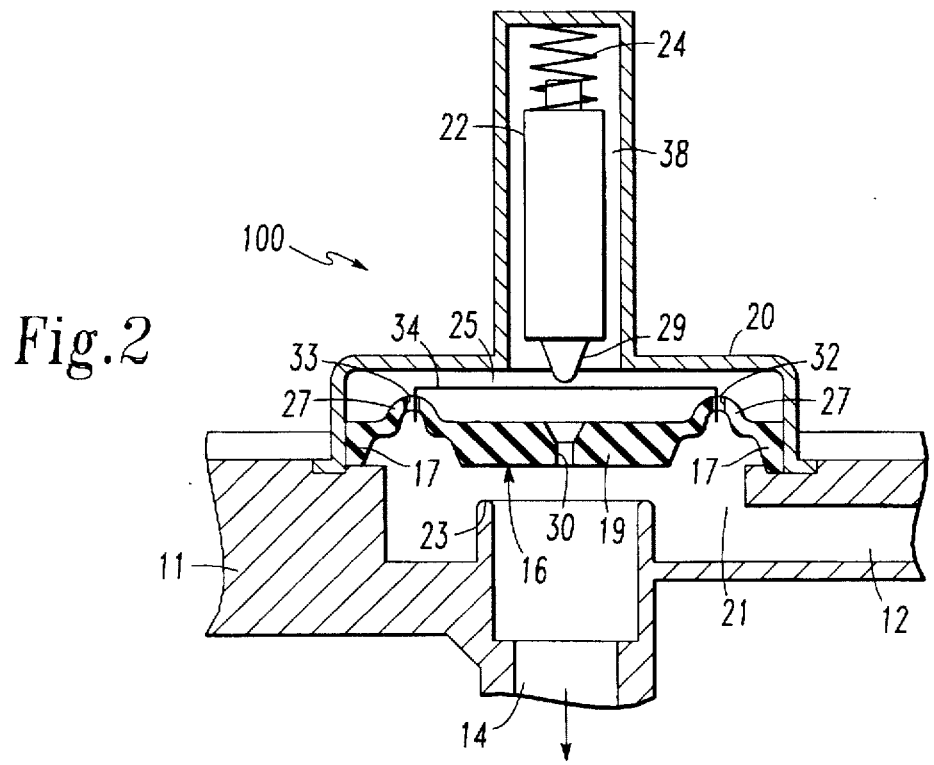
FIG. 2 is a cross-sectional view of the control valve of FIG. 1 incorporating the present invention.

Referring to FIG. 2, the valve 100 is substantially identical to the valve 10 illustrated in FIG. 1 with the exception of the diaphragm 16. As with valve 10, valve 100 includes a valve housing 11 having an inlet 12 and outlet 14 extending therefrom. Positioned within the housing 11 is diaphragm 31 which seals off fluid communication between the inlet 12 and outlet 14 and which may be readily displaced in response to movement of the armature 22 provided within the armature guide 20. The outer periphery 17 of the diaphragm 31 is secured in place while the interior portion 19 of the diaphragm is permitted to reciprocate within the housing 11 in response to movement of the armature 22 and fluid pressure exerted on the diaphragm through inlet 12.

Valve inlet 12 opens into an annular pressure chamber 21 that communicates by way of valve seat 23 with the outlet 14. Above the diaphragm 31 is a control space 25 that is embraced by the upper surface of the diaphragm 31 and the armature guide 20. Like the diaphragm 16 of FIG. 1, the diaphragm 31 of FIG. 2 includes a thinned region 27 which encircles the central region 19 of the diaphragm 31. These thinned regions permit the central portion 19 of the diaphragm 31 to readily reciprocate within the housing 11. As above, these thinned areas provide the flexure point between the outer periphery 17 and central portion 19 of the diaphragm 31. As with the valve illustrated in FIG. 1, the armature 22 of valve 100 is readily displaced within the armature guide 20 by way of an electromagnetic actuator (not shown). Further, biasing the armature 22 in the closed direction is coil spring 24. The armature includes an extended nose 29 which seals off a central orifice 30 formed in the central portion 19 of the diaphragm 31. Unlike the diaphragm 31 illustrated in FIG. 1, the thinned region 27, the diaphragm 31 illustrated in FIG. 2 includes diametrically opposed bleed orifices 32 and 33. The significance of the diametrically opposed bleed orifices will be discussed in greater detail in connection with the operation of the valve illustrated in FIG. 2.

In addition to the diametrically opposed bleed orifices 32 and 33, the valve 100 includes a wire form 34 which extends into each of the bleed orifices 32 and 33, respectively. The wire form 34 may take on a number of formations, some of which are discussed in greater detail hereinbelow. The diametrically opposed bleed orifices 32 and 33 permit the wire form 34 to remain in place with respect to the diaphragm 16. Additionally, the wire form 34 is formed in a manner which permits the armature 22 to bypass the wire form 34 and sealingly engage the central orifice 30.

It has been found that careful control of fluid flow through the bleed orifices 32 and 33 can result in a softening of the closure of the diaphragm 31 such that the fluid flow is slowed to a rate which results in substantially no compression wave being developed and consequently no water hammer effect observed in the system. Additionally, unlike the prior art devices, the wire form 34 extends through the bleed orifices 32 and 33 formed in the thinned region 27 of the diaphragm 31. It is the thinned region 27 which undergoes the most flexure during the operation of the valve and consequently agitation of the wire form 34 extending through the orifice aids in scrubbing the orifices during operation. This results in maintaining the bleed orifices 32 and 33 free of debris resulting in a smoother operating valve. Additionally, as can be seen from the valve 100, should the diaphragm 31 or wire form 34 fail, each component can be readily replaced without destruction of major components of the valve itself. Accordingly, the valve assembly 100 illustrated in FIG. 2 provides a valve structure which eliminates water hammer effects through the system in an economical manner.

Figure 3:
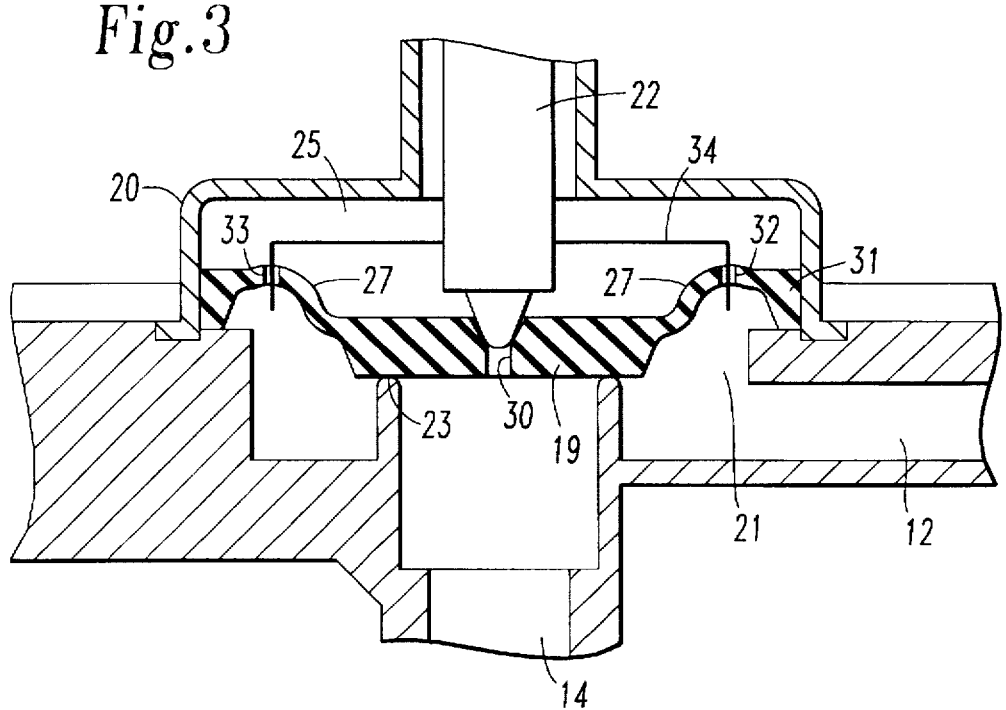
FIG. 3 is an expanded view of the diaphragm portion of the valve of FIG. 2 illustrated in the closed position.
Figure 4:
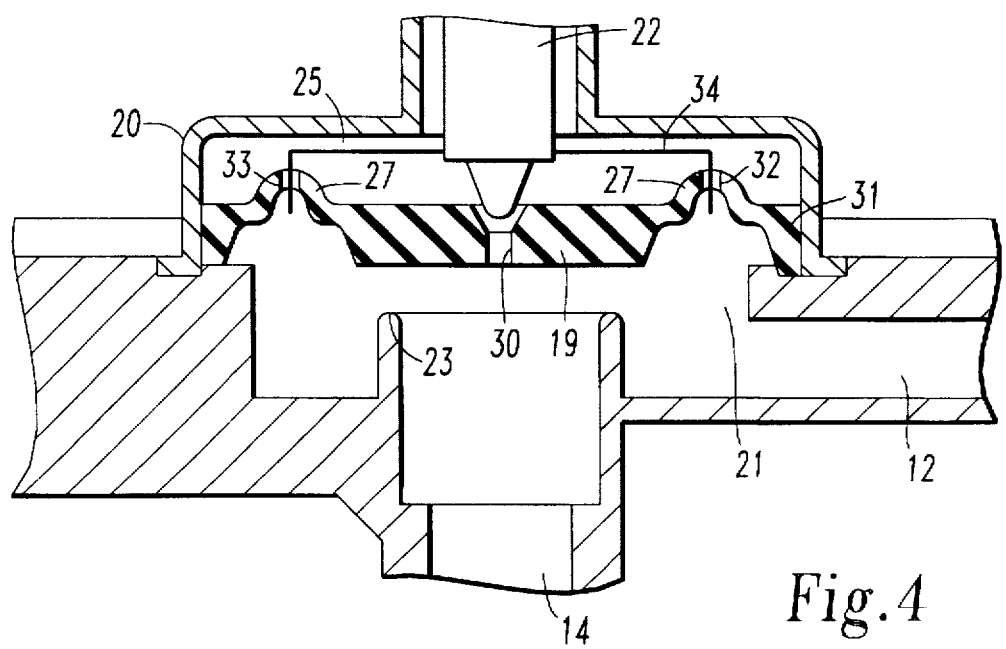
FIG. 4 is an expanded view of the diaphragm portion of the valve of FIG. 2 in a closing condition.

The particular operation of the valve illustrated in FIGS. 2-4 will now be discussed in greater detail. With reference first to FIG. 3, the valve assembly 100 is illustrated in the closed position. As can be seen from FIG. 3, the central portion 19 of the diaphragm 31 engages the valve seat 23 formed about the outlet 14. Fluid directed to the valve assembly 100 by way of fluid inlet 12 pressurizes the pressure chamber 21 with this fluid pressure bleeding through the bleed orifices 32 and 33 into the control chamber 25 such that the pressure within the control chamber 25 is equal to that in the pressure chamber 21. The valve assembly remains in this static position so long as the armature 22 remains seated against the central portion 19 of the diaphragm 31 closing off the central bore 30 such that there is no fluid communication with the fluid outlet 14 for either the pressure chamber 21 or control chamber 25. As is readily illustrated in FIG. 3, the wire form 34 extends into both bleed orifices 32 and 33 which are formed in the thinned portion 27 of the diaphragm 31. When energized, the armature 22 retracts against the force of the coil spring 24 and is displaced away from the central bore 30 of the diaphragm 16. This initial movement of the armature 22 from the closed position to the open position is illustrated in FIG. 2. When the armature 22 is displaced from the seat within the central bore 30, fluid is dispersed through the central bore 30 into the outlet 14 thus reducing the pressure within the control chamber 25. In doing so, the pressure of the fluid within the pressure chamber 21 is greater than that in the control chamber 25 thus displacing the central portion of the diaphragm 31 to the position illustrated in FIG. 2 and establishing fluid communication between the inlet 12 and outlet 14. During the flow of fluid through the valve 100, fluid also passes through each of the bleed orifices 32 and 33 and into the control chamber 25 and subsequently through the central bore 30 into the outlet 14.

Upon de-energization of the electromagnetic actuator, the armature 22 is displaced back toward the central portion 19 of the diaphragm 31 thus closing off the central bore 30. FIG. 4 illustrates the armature 22 just prior to being seated in the central bore 30. Once seated in the central bore, the fluid pressure within the control chamber 25 becomes equal to that of the fluid pressure within the pressure chamber 21. With the pressures approaching equality, the coil spring 24 continues to extend the armature 22 towards the central portion 19 of the diaphragm 31 and ultimately presses the central portion 19 of the diaphragm 31 against valve seat 23 thereby sealing off fluid communication between the inlet 12 and outlet 14.

It is during this closing that the bleed orifices 32 and 33 permit the central portion 19 of the diaphragm 31 to move into contact with the valve seat 23 in a stable and controlled manner. Because the diaphragm 31 includes at least two diametrically opposed bleed orifices, the central portion 19 of the diaphragm 31 will descend towards the valve seat in a stable manner. Further, the wire form 34 acts to meter the fluid flow from the pressure chamber 21 to the control chamber 25 to a slow, controllable rate depending upon the ratio of the diameter of the wire form 34 to the diameter of the bleed orifices 32 and 33. Accordingly, the rate at which the valve closes can be readily controlled by selecting a wire form having a predetermined diameter with respect to the diameter of the bleed orifices 32 and 33. In doing so, a stable and controlled closing of the diaphragm is achieved is accordance with the present invention in a economical manner thus eliminating any compression wave which may otherwise be developed in the system.

Additionally, as will be appreciated, because the bleed orifices 32 and 33 are formed in the thinned region 27 of the diaphragm 31 and is this portion of the diaphragm which undergoes the greatest flexing action by providing the wire form 34 in this region of greatest flexure, the bleed orifices 32 and 33 are scrubbed in that the wire form moves independent of the diaphragm itself. In doing so, the scrubbing action within the bleed orifices washes away any collected particles that may build up and otherwise clog these orifices. Additionally, by providing diametrically opposed orifices, should one orifice become clogged, the second orifice can continue to successfully control the opening and closing of the valve in a controlled manner.

Figure 5A:
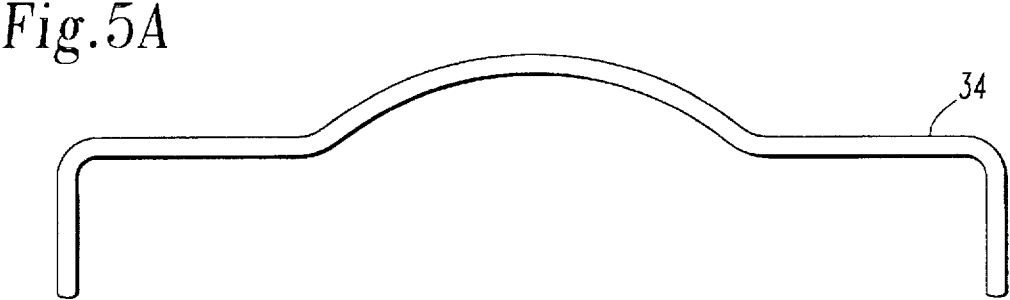
FIGS. 5A through 5D illustrate various wire forms which may be utilized in association with the present invention.
Figure 5B:
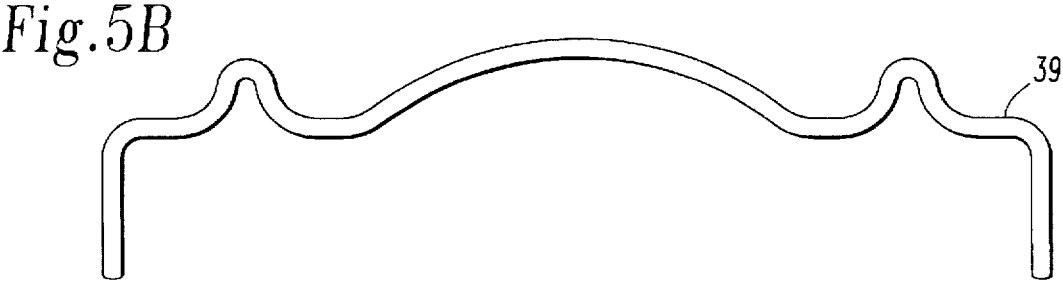
Figure 5C:
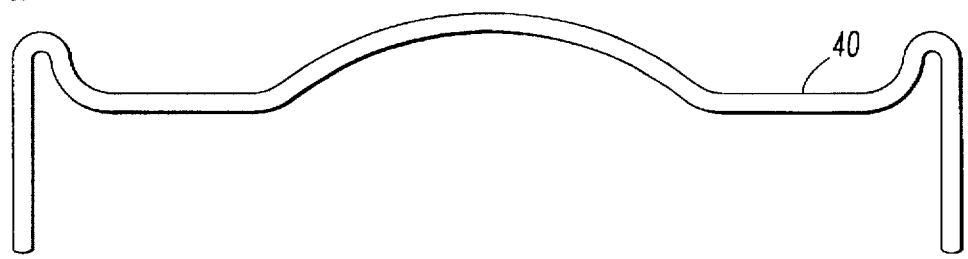
Figure 5D:
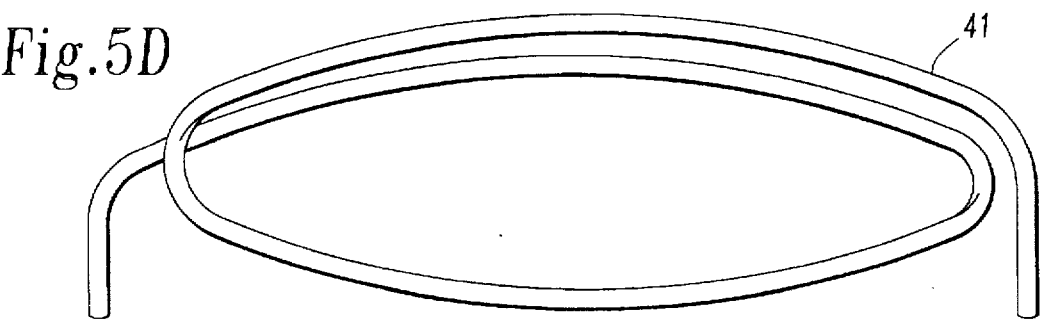

Referring now to FIGS. 5A through 5D, various configurations of the wire form are illustrated therein. FIG. 5A illustrates the wire form 34 used in the valve illustrated in FIGS. 2-4. As can be seen from FIG. 5A, the wire form 34 includes a curved section for accommodating the armature 22. Other wire forms 39, 40 and 41 which achieve the desired effect in accordance with the present invention are illustrated in FIGS. 5B through 5D.

Accordingly, by providing an independent wire form and diametrically opposed bleed orifices, a stable and controlled closing action can be achieved in accordance with the present invention. Moreover, this stable and controlled closing of the valve eliminates compression waves within the system and provides an assembly which may be serviced in an economic manner.

While the present invention has been described with reference to a preferred embodiment, it will be appreciated by those skilled in the art that the invention may be practiced otherwise than as specifically described herein without departing from the spirit and scope of the invention. It is, therefore, to be understood that the spirit and scope be limited only by the appended claims.

We claim:

1. A control valve assembly for selectively controlling a flow of fluid through a fluid flow system comprising:

a valve housing having a fluid inlet and a fluid outlet;

a valve seat positioned about said fluid outlet;

a sealing diaphragm for cooperating with said valve seat for selectively sealing off fluid communication between said fluid inlet and said fluid outlet, said diaphragm fluidically separating a pressure chamber and a control chamber from one another within said housing and reciprocal between an open position and a closed position; said diaphragm including a reciprocal central region, a fixed outer periphery and an intermediate flexing region bridging said central region and said outer periphery;

a central control orifice formed in said diaphragm fluidically communicating between said control chamber and said fluid outlet;

an armature reciprocally received in said housing for selectively sealing off fluid communication between said control chamber and said fluid outlet;

at least two bleed orifices formed in said intermediate flexing region of said diaphragm fluidically communicating between said pressure chamber and said control chamber; and a freely movable metering element extending across said diaphragm and into each of said bleed orifices for controlling a flow of fluid between said pressure chamber and said control chamber; said metering element being continuously received in each of said bleed orifices during the reciprocal movement of said sealing diaphragm for continuously cleaning said bleed orifices.

2. The control valve assembly as defined in claim 1, further comprising an electromagnetic actuator for selectively displacing said armature out of sealing engagement with said central control orifice.

3. The control valve assembly as defined in claim 2, further comprising a biasing means for biasing said armature into contact with said central control orifice.

4. The control valve assembly as defined in claim 1, wherein said metering element is an elongated wire form extending between said bleed orifices.

5. The control valve assembly as defined in claim 4, wherein said bleed orifices are of a predetermined diameter.

6. The control valve assembly as defined in claim 5, wherein said wire form is of a predetermined diameter less than the predetermined diameter of said bleed orifices.

7. The control valve assembly as defined in claim 6, wherein a ratio of the predetermined diameter of said bleed orifices and the predetermined diameter of said wire form controls a flow rate of fluid between said control chamber and said pressure chamber.

8. The control valve assembly as defined in claim 1, wherein said bleed orifices are diametrically opposed to one another.

9. The control valve assembly as defined in claim 1, wherein a thickness of said flexing region is less than a thickness of said central region.

10. The control valve assembly as defined in claim 9, wherein said diaphragm is formed of an elastomeric material.

11. The control valve assembly as defined in claim 9, wherein said metering element is an elongated wire form extending between said bleed orifices.

12. The control valve assembly as defined in claim 11, wherein said bleed orifices are of a predetermined diameter.

13. The control valve assembly as defined in claim 12, wherein said wire form is of a predetermined diameter less than the predetermined diameter of said bleed orifices.

14. The control valve assembly as defined in claim 13, wherein a ratio of the predetermined diameter of said bleed orifices and the predetermined diameter of said wire form controls a flow rate of fluid between said control chamber and said pressure chamber.

15. The control valve assembly as defined in claim 14, wherein said bleed orifices are diametrically opposed to one another.

16. The control valve as defined in claim 1; wherein said metering element includes an elongated wire form extending between said bleed orifices, said wire form having means for permitting the reciprocal movement of said armature.

* * * * *